(12) United States Patent  (10) Patent No.: US 8,046,849 B2
Gaiti  (45) Date of Patent: *Nov. 1, 2011

(54) SHOWER HEATED BY SOLAR ENERGY

(75) Inventor: Giorgio Gaiti, Correggio (IT)

(73) Assignee: G.F. S.R.L., Correggio (IT)

( * ) Notice: Subject to any disclaimer, the term of this patent is extended or adjusted under 35 U.S.C. 154(b) by 284 days.

This patent is subject to a terminal disclaimer.

(21) Appl. No.: 12/089,647

(22) PCT Filed: Oct. 19, 2006

(86) PCT No.: PCT/IB2006/003033
§ 371 (c)(1),
(2), (4) Date: Apr. 9, 2008

(87) PCT Pub. No.: WO2007/054766
PCT Pub. Date: May 18, 2007

(65) Prior Publication Data
US 2008/0256700 A1  Oct. 23, 2008

(30) Foreign Application Priority Data
Nov. 14, 2005 (IT) .............................. RE2005A0128

(51) Int. Cl.
A47K 3/022 (2006.01)
(52) U.S. Cl. .......................... 4/598; 126/655; 126/656

(58) Field of Classification Search ...... 4/598; 126/634, 126/643, 651, 655, 656
See application file for complete search history.

(56) References Cited

U.S. PATENT DOCUMENTS

| 2,213,894 | A | * | 9/1940 | Barry | 126/592 |
| 2,349,694 | A | * | 5/1944 | Barr et al. | 237/12.3 C |
| 3,431,565 | A | * | 3/1969 | Nelson | 4/598 |
| 4,086,911 | A | * | 5/1978 | Futch | 126/591 |
| 4,513,731 | A | * | 4/1985 | Campbell | 126/646 |
| 5,507,275 | A | * | 4/1996 | Clark | 126/627 |
| 5,660,164 | A | * | 8/1997 | Rodriguez Sanchez | 126/640 |
| 6,446,930 | B1 | * | 9/2002 | Li | 248/519 |

FOREIGN PATENT DOCUMENTS

DE  201 03 907 U1  6/2001
IT  BO20020067 U  1/2004

* cited by examiner

*Primary Examiner* — Gregory Huson
*Assistant Examiner* — Janie Christiansen
(74) *Attorney, Agent, or Firm* — Pearne & Gordon LLP

(57) ABSTRACT

The shower heated by solar energy comprises a platform (2), to a base (2a) of which is connected a piping (3) containing a water supply. A tubular body (4) is connected superiorly to the platform (2), bearing a shower head (5) at a top thereof. The platform (2) internally exhibits a plurality of conduits (7) for retaining water, which plurality of conduits (7) is exposed to solar rays.

15 Claims, 2 Drawing Sheets

SHOWER HEATED BY SOLAR ENERGY

TECHNICAL FIELD

The device relates to the field of furnishings for outside environments or to the bathing sector.

BACKGROUND ART

The prior art teaches various types of showers.

The most widely found on the commercial market exhibit a head in hydraulic connection, generally via a tap valve, with a double piping for dispensing cold and hot water, the hot water coming from a boiler.

These types of showers are generally preferred for domestic environments and require installation by specialists.

The use of these showers is not preferred in open environments for obvious economic reasons.

For example, in bathing establishments or open-air swimming pools it is preferable to use showers which, once the summer season is over, can easily be removed, so that they are not subject to winter weather conditions or, even worse, to the attention of vandals.

By using portable showers, it becomes necessary to attached thereto a heating source, in place of the boiler, which heats up the water exiting from the head.

An example from the prior art includes use of a bag, located superiorly of the head and containing a quantity of water.

Externally the bag is of a dark colour so as to absorb the solar rays and consequently to heat up the water contained therein.

This type of shower has the disadvantage of having a small containing capacity for the hot water, which is linked to the size of the bag.

To obviate this drawback, Italian patent application BO2002U000067 illustrates a type of shower exhibiting a base platform from which a pipe develops vertically, which pipe terminates superiorly in the head.

The pipe is of a dark colour, and is externally enveloped by a casing, preferably trunco-cylindrical, made of a translucent material.

In this type of shower the heating of the water is obtained thanks to the sun's rays which strike the pipe and at the same time, thanks to the air jacket interpositioned between the pipe and the casing, heat loss is reduced.

This type of shower has a first disadvantage of having a small amount of surface exposed to the solar rays, which is correlated to the external diameter of the pipe.

Also, this type of shower, although provided with a greater capacity than other known types on the market, is still not up to market needs in terms of autonomy.

The conformation of this type of shower has the further drawback of being unwieldy, which is connected with the difficulty of dismounting it into its constituent parts.

In addition to this, the above-summarised portable showers do not enable cold water to be dispensed from the head in alternation with hot water.

The main aim of the present invention is to provide a sun-heated heated shower having a large surface exposed to the sun's rays and a large water reservoir.

A further aim of the present device is to provide a sun-heated shower which can provide both hot and cold water through the head.

A further aim of the present device is to provide a sun-heated hot shower which is flexible and easy to dismount, being thus small enough to store easily.

An additional aim of the present device is to provide a shower for outside use which is statically stable on the ground, even when not installed on perfectly flat terrain, or when subject to gusts of wind.

This aim and further advantages are all attained by the present invention, as it is characterised in the accompanying claims.

DISCLOSURE OF INVENTION

Further characteristics and advantages of the present invention will better emerge from the detailed description that follows of a preferred embodiment of the invention, illustrated purely by way of non-limiting example in the accompanying figures of the drawings, in which.

Figures 1, 4:
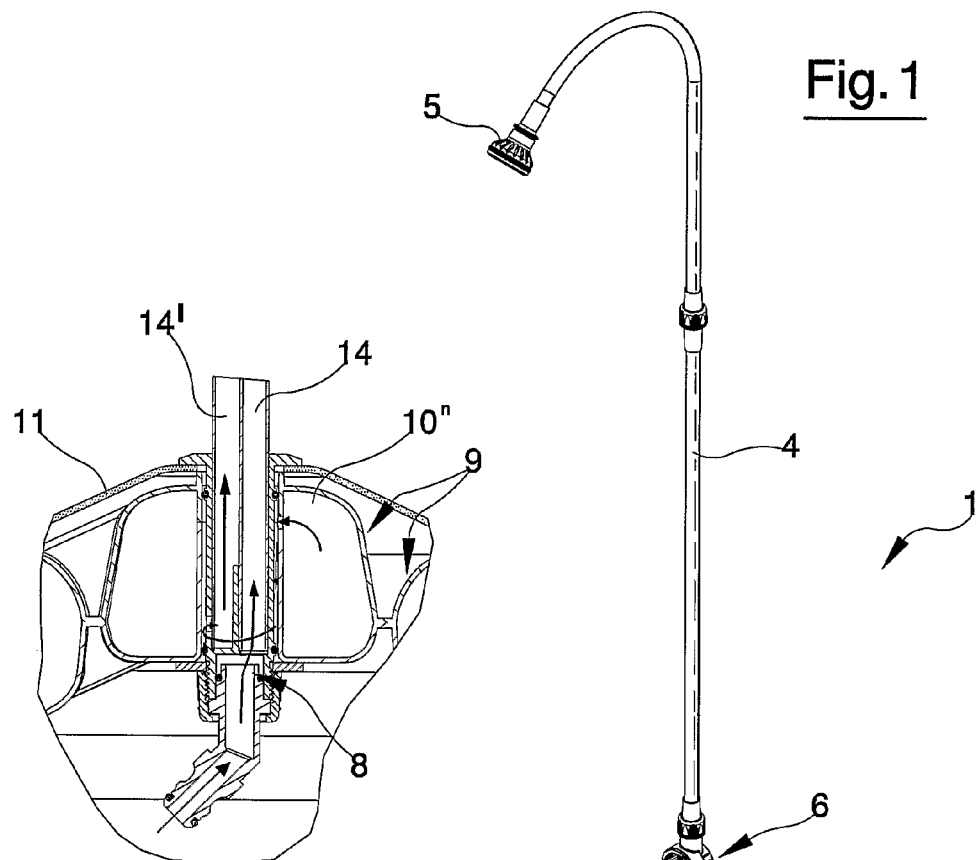
FIG. 1 is a perspective view of a solar-ray heated shower of the invention.
FIG. 4 is a detailed view of a second detail of the shower of the invention.

With reference to the figures of the drawings, 1 denotes in its entirety a solar-ray heated shower, object of the present invention.

The shower 1 exhibits a platform 2, exhibiting a base 2a and a top 2b, and a water pipe 3 connecting at the base 2a.

The platform 2 is in hydraulic communication, preferably at the top 2b thereof, with a tubular body 4 which bears at an end thereof a shower head 5.

The platform 2 exhibits, as illustrated in the figures of the drawings, a lateral perimeter and a substantially truncoconical shape, with the base 2a facing towards the ground.

At the base 2a of the platform 2 there is a pair of handles 16, 16' for use in moving the shower 1.

The platform 2 internally exhibits a plurality of conduits 7 which collect water which is then exposed to the sun's rays.

The plurality of conduits 7 is superiorly enclosed by a preferably translucent cover 11.

The plurality of conduits 7 and the cover 11 together define means for absorbing solar energy 17.

The plurality of conduits 7 is defined by a substantially vertical first tract 8 which is destined to supply cold water and axially crosses the base 2 platform, and by a substantially spiral-developing second tract 9 destined to supply hot water which goes from the base 2a to the top 2b of the platform 2.

Figure 2:
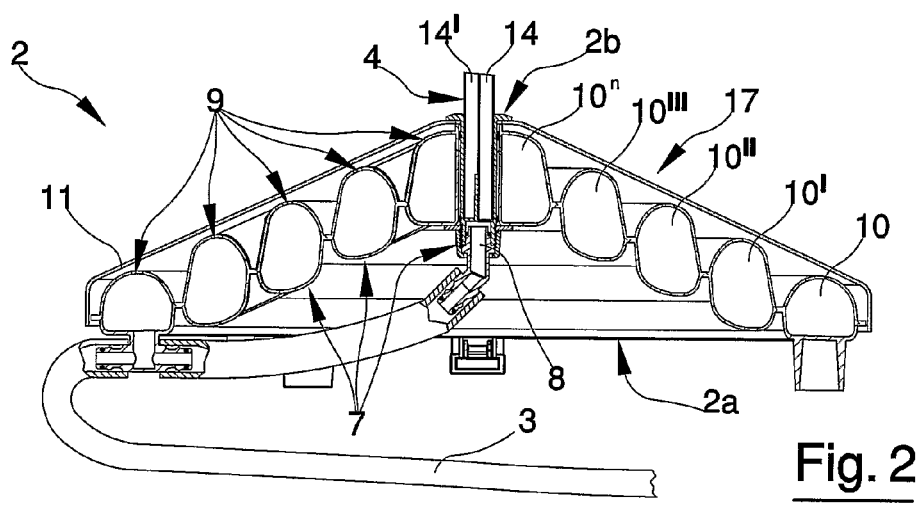
FIG. 2 is a frontal section view of a first detail of the shower of the invention.

As shown in FIG. 2, a cold water conduit extends from adjacent the perimeter of the platform and beneath the plurality of conduits to a first location beneath the top of the platform.

The second tract 9, which is dark and preferably opaque, exhibits a plurality of circular pipes 10, 10', 10", 10'''.

The plurality of circular pipes 10, 10', 10", 10''', preferably concentric, exhibit a decreasing radius in a direction going from the base 2a up to the top 2b.

Each lower circular pipe is in communication with a corresponding higher pipe via a respective lower opening 12, 12', 12", ..., $12^{n-1}$.

The plurality of openings 12, 12', 12", ..., $12^{n-1}$ are in alternated arrangement either side of a separating wall 13 transversally crossing the plurality of pipes 10, 10', 10", 10'''.

Figure 3:
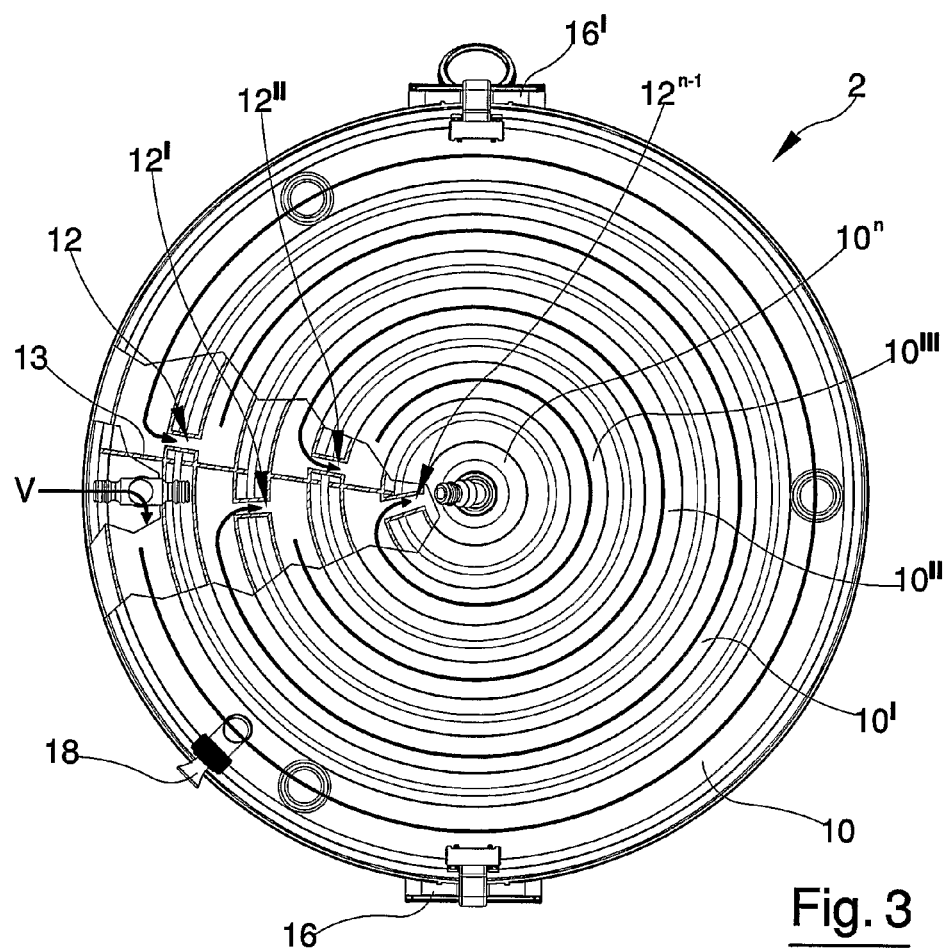
FIG. 3 is a plan view of the detail of FIG. 2.

The plurality of openings, in collaboration with the separating wall 13, cause a circulation of the water, denoted in FIG. 3 by the letter V, which circulation is spiral and concentric in alternating directions.

The tubular body 4, at the lower tract communicating with the platform 2, is sub-divided into a first chamber 14 and a second chamber 14'.

The first chamber 14 is in hydraulic communication with the first tract 8.

Similarly the second chamber 14' is in hydraulic communication with the second tract 9, preferably with the final pipe 10n located at the top 2b of the platform.

A safety valve 18 is located opposite the final pipe 10′′, i.e. at the first pipe 10, preferably in the lower region thereof; the safety valve 18 is for safeguarding the tank from pressure peaks.

The tubular body 4 exhibits a mixer tap valve 6 inserted in the middle part thereof, for regulating the flow and temperature of the water issuing from the head 5.

The tap valve 6, which is of known type, enables regulation of the water jet exiting from the head 5, partially and/or alternatively by-passing the water flow crossing the first tract 8 and/or the second tract 9.

The pipe 3 supplies both the first tract 8 and the second tract 9.

The device operates as follows.

Once the shower 1 is positioned on the ground, the hydraulic connection of the pipe 3 on the first and second tracts 8, 9 of the conduits is set up.

Then, by acting on the mixer tap valve 6, in the case of a by-passing of the second tract 9 cold water is obtained from the head 5 through the first tract 8, and in the case of a by-passing of the first tract 8, the plurality of pipes 10, 10', 10′′, . . . , 10′′ is filled up.

After having filled up the pipes 10, 10', 10′′, . . . , 10′′ the tap valve 6 is closed.

When the shower 1 is left in the position it has been located in, the solar rays begin their action, heating up the water accumulated in the plurality of circular pipes 10, 10', 10′′, . . . , 10′′.

By newly acting on the tap valve 6, hot water will issue from the head 5, heated internally of the second tract 9.

The tracts 9 are rather large, so as to be able to provide an adequate volume of hot water.

This also leads to a particularly good stability of the shower, without any need for applying ballast, thanks to the weight of the water which fills the conduits at the base 2.

The invention claimed is:

1. A shower heated by solar energy, comprising:
a platform having a lateral perimeter and comprising a base and a top, to which platform a piping is connected, said piping being connectable to a water supply;
a tubular body extending from the top of the platform to a shower head, the tubular body defining within the tubular body a cold water passageway and a hot water passageway;
the platform having internally thereof a plurality of conduits for retaining water, which plurality of conduits is exposable to solar rays to heat water therewithin, wherein a cold water conduit extends from adjacent the perimeter of the platform and beneath the plurality of conduits to a first location beneath the top of the platform and then extends substantially vertically via a first tract and connects to the cold water passageway in the tubular body for guiding cold water to the head, wherein said plurality of conduits comprises a substantially spiral-developing second tract which receives cold water adjacent the perimeter of the platform and guides said water to the top of the platform where the second tract connects to the hot water passageway in the tubular body for guiding hot water to the head.

2. The shower heated by solar energy of claim 1, wherein the plurality of conduits is superiorly closed by a translucent cover.

3. The shower heated by solar energy of claim 2, wherein the plurality of conduits and the translucent cover together define means for absorbing solar rays confined within the platform.

4. The shower heated by solar energy of claim 1, wherein the platform has a truncoconical shape, with the base thereof facing towards the ground.

5. The shower heated by solar energy of claim 1, wherein the second tract exhibits a plurality of circular pipes concentric to one another, with a decreasing radius starting from the base and going towards the top of the platform, each lower of the plurality of circular pipes communicating with a corresponding higher of the plurality of circular pipes via a respective opening.

6. The shower heated by solar energy of claim 5, wherein the plurality of openings exhibits an alternated arrangement either side of a separating wall crossing the plurality of circular pipes.

7. The shower heated by solar energy of claim 6, wherein the plurality of openings, in collaboration with the separating wall, cause a circulation of the water in a spiral direction in an alternating concentric direction.

8. The shower heated by solar energy of claim 1, wherein the tubular body defines the cold water passageway and the hot water passageway at a lower tract of the tubular body.

9. The shower heated by solar energy of claim 1, wherein the tubular body exhibits, in a middle part thereof, a mixer tap valve for regulating a flow and a temperature of the water issuing from the head.

10. The shower heated by solar energy of claim 9, wherein the tap valve is designed to mix a jet of water issuing from the head, partially by-passing a flow of water coming from the first tract or from the second tract.

11. The shower heated by solar energy of claim 1, wherein the platform exhibits, at the base thereof, a pair of handles for enabling displacement of the shower.

12. The shower heated by solar energy of claim 5, wherein a lower circular pipe of the plurality of circular pipes exhibits a safety valve for safeguarding the platform from pressure peaks.

13. The shower heated by solar energy of claim 1, wherein the second tract is made of a dark material which is opaque.

14. A shower heated by solar energy, comprising:
a platform exhibiting a base and a top, to which base a piping containing a water supply is connected;
a tubular body, inferiorly in hydraulic communication with the platform at the top of the platform and bearing at an upper end thereof a head;
the platform exhibiting internally thereof a plurality of conduits for retaining water, which plurality of conduits being exposed to solar rays, wherein the plurality of conduits is defined by a substantially vertical first tract which is destined to supply cold water and axially crosses the base platform, and by a substantially spiral-developing second tract designed to supply hot water, wherein water flows from the base to the top of the platform, wherein the second tract exhibits plurality of circular pipes concentric to one another, with a decreasing radius starting from the base and going towards the top of the platform, each lower of the plurality of circular pipes communicating with a corresponding higher of the plurality of circular pipes via a respective opening.

15. A shower heated by solar energy, comprising:

a platform exhibiting a base and a top, to which base a piping containing a water supply is connected;

a tubular body, inferiorly in hydraulic communication with the platform at the top of the platform and bearing at an upper end thereof a head;

the platform exhibiting internally thereof a plurality of conduits for retaining water, which plurality of conduits being exposed to solar rays, wherein the plurality of conduits is defined by a substantially vertical first tract which is destined to supply cold water and axially crosses the base platform, and by a substantially spiral-developing second tract designed to supply hot water, wherein water flows from the base to the top of the platform, wherein the second tract exhibits a plurality of circular pipes concentric to one another, with a decreasing radius starting from the base and going towards the top of the platform, each lower of the plurality of circular pipes communicating with a corresponding higher of the plurality of circular pipes via a respective opening, wherein a lower circular pipe of the plurality of circular pipes exhibits a safety valve for safeguarding the platform from pressure peaks.

* * * * *